L. NELSON.
RESILIENT HUB FOR VEHICLE BEARING WHEELS.
APPLICATION FILED JULY 26, 1915.

1,174,268.

Patented Mar. 7, 1916.

Inventor
Ludwig Nelson

Herbert E. Smith
Attorney

UNITED STATES PATENT OFFICE.

LUDVIG NELSON, OF TROY, IDAHO.

RESILIENT HUB FOR VEHICLE-BEARING WHEELS.

1,174,268.  Specification of Letters Patent.  Patented Mar. 7, 1916.

Application filed July 26, 1915. Serial No. 42,019.

*To all whom it may concern:*

Be it known that I, LUDVIG NELSON, a resident of the United States and citizen of Sweden, residing at Troy, in the county of Latah and State of Idaho, have invented certain new and useful Improvements in Resilient Hubs for Vehicle-Bearing Wheels, of which the following is a specification.

This invention relates to improvements in resilient wheel hubs and has for its object the avoidance of use of usual pneumatic and cushion tires, the hub itself providing the desired resiliency for cushioning action for the vehicle.

My invention includes spring abutments which are normally urged away from each other endwise of the hub by an interposed expansively acting spring, connections being provided whereby this spring thrust will serve to yieldingly counteract the thrust exerted by the wheel in transmitting the load to the hub.

My invention also includes a housing which is mounted, either directly or indirectly upon said abutments so as to be held in concentric relation therewith, the abutments being supported by sets of fulcrumed arms which normally act, in connection with the expansive spring, to hold said abutments in concentric relation with the axis of the hub but which are capable of movement to permit the housing and abutments to assume an eccentric position with respect to the axis of the hub when the wheels impart thrust to the hub.

Other features and objects of the invention will be more fully described in connection with the accompanying drawing and will be more particularly pointed out in and by the appended claims.

Figure 1:
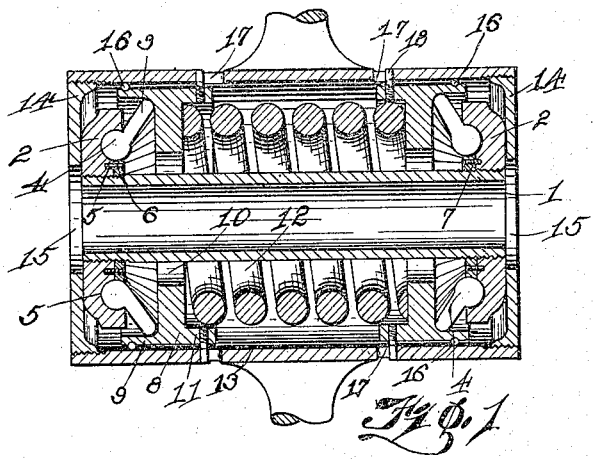
Figure 2:
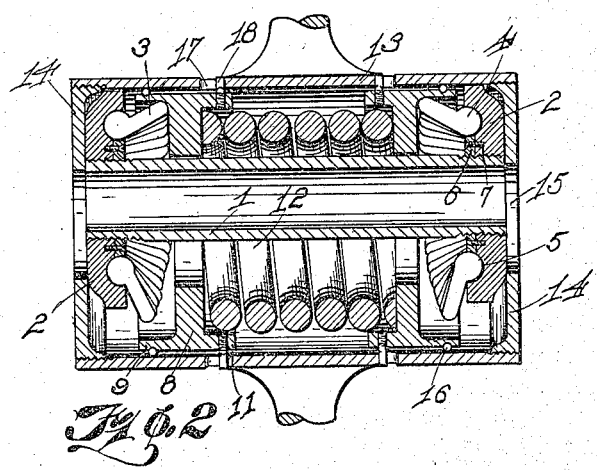
Figure 3:
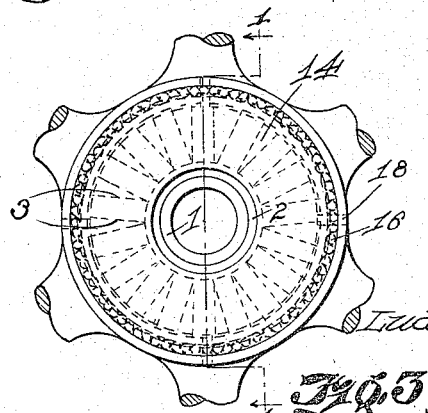

In the drawing:—Figure 1 is a vertical sectional view on line 1—1 of Fig. 3, showing the parts in a normal or concentric relation. Fig. 2 is a view similar to Fig. 1 showing the parts under wheel thrust and in an eccentric relation with respect to the hub axis. Fig. 3 is an end view of my improved hub with the parts in position shown in Fig. 1.

Like characters of reference designate similar parts throughout the different figures of the drawing.

As illustrated, 1 designates a sleeve which may be suitably fixed to an axle, not shown, so that the sleeve 1 will be held against rotative or longitudinal movement on the axle but preferably, the sleeve 1 will be rotative on the axle although in all cases it will be held from longitudinal movement thereon. Supporting nuts 2 are threaded on the sleeve 1 so as to be held in fixed relation with respect thereto and said nuts 2 are preferably anchored near the ends of said sleeve. Supporting arms 3, having enlarged ends 4, are fulcrumed on the nuts 2 and preferably the latter will be provided with a plurality of annularly disposed seats or sockets 5 for receiving the enlarged heads 4. The sockets 5 open laterally from the nuts 2, preferably at the inner faces thereof, and the supporting arms 3 radiate from the nuts 2 at an acute angle with respect to the planes of the nuts. A holding ring 6 is provided for each nut and each holding ring is secured in position by a plurality of screws 7 which are shown turned into the nuts 2. I desirably thread the rings 6 so that they will be turned onto the end threads of the sleeve 1 which will thereby cause the retaining rings 6 to also function as locking nuts to hold the supporting nuts 2 against turning movement from their initial position of adjustment.

Spring abutments 8, in the form of annular rings, are disposed between the nuts 2 and are provided with overhanging flanges 9 for engagement with the supporting arms 3. The abutments 8 are bored, as at 10, to loosely fit about the sleeve 1 so that the abutment 10 can either assume a concentric position with respect to the sleeve 1, as shown in Fig. 1, or an eccentric position with respect thereto, as shown in Fig. 2. Said abutments 8 are also provided with flanges 11 within which the end coils or convolutions of an expansively acting spring 12, fit. The ends of spring 12 actually engage against the inner faces of the abutments 8, but the flanges 11 hold the spring 12 in concentric relation with the abutments 8.

My improved hub structure includes a housing 13 which is shown as having an internal diameter slightly in excess of the diameter of the abutments 8 so that the latter will have a slight clearance with respect to the interior of the housing 13. The housing 13 is provided with heads 14 which are shown threaded into the ends of the housing 13, the heads 14 having endwise engagement with the nuts 2. Said heads 14 are also provided with bores 15 which are of sufficient diameter to permit the heads 14 to either assume concentric or eccentric positions with respect to the axle. By reason of the sliding engagement of the heads 14 with nuts 2, the housing is at all times held against longitudinal movement with respect to the remainder of the structure.

Interposed between the abutments 8 and the housing 13 is a plurality of anti-friction elements such as balls 16 to take up friction resulting from relative longitudinal movement of the abutments 8 with respect to the housing 13. I preferably connect the abutments 8 with the housing 13 in such a manner that the same will be held against relative rotative movement with respect to each other, and also, to permit relative longitudinal movement of the abutments with respect to the housing to a predetermined extent.

As illustrated, the housing 13 is provided with longitudinal disposed slots 17 and the abutments are provided with pins 18 which extend into said slots 17, as clearly shown in Figs. 1 and 2.

Now with reference to Fig. 1, it will be seen that the endwise thrust imparted by spring 12 will be exerted upon the abutments 8 so as to force the latter toward the nuts 2. Because of the supporting arms 3, the abutments 8 will normally be held in concentric relation with respect to the sleeve 1. These radiating arms 3, fulcrumed in the nuts 2, when spread outwardly as shown in Fig. 1, will engage the abutments 8 at a plurality of points to maintain concentricity. However, when thrust is imparted by the load transversely to the axis of the hub, then the housing will exert thrust upon the abutments, the arms 3 will turn in their mountings, as illustrated, from the position shown in Fig. 1 to the position in Fig. 2, thereby moving the abutments toward each other and compressing spring 12. In this instance, the upper arms 3 will be engaged with the abutments and the lower arms 3, as shown in Fig. 2 will be idle. However, there is no torsion on the spring 12 because the latter will always be free from the sleeve 1 and will be held in a normal position by the abutments 8 for expansion or contraction axially in the housing 13. Furthermore, the spring 12 does not act as a supporting element as the supporting thrust is directly imparted to the arm 3 and is sustained by the nuts 2.

When the sleeve 1 rotates on the axle, then there will be no friction whatever except what little friction is taken up by the balls 16 and the points of contact of the arms 3 with the abutments 8.

It is believed that the advantages and utilities of my invention will be clearly understood from the foregoing description, and while I have herein shown and described one specific form of my invention, I do not wish to be limited thereto except for such limitations as the claims may import.

I claim:—

1. In a resilient hub for vehicle bearing wheels, an axle sleeve, supporting nuts fixed on said sleeve, a housing surrounding said sleeve and having endwise engagement with said nuts to hold said housing against longitudinal movement, spring abutments between said nuts, supporting arms fulcrumed on said nuts and engaging said abutments, and an expansively acting spring interposed between said abutments and normally forcing said abutments endwise away from each other into engagement with said arms thereby normally supporting said abutments in concentric relation with said sleeve against thrust from said wheel, and means interposed between said abutments and said housing to support the latter in concentric relation with the former, substantially as described.

2. In a resilient hub for vehicle bearing wheels, an axle sleeve structure, supporting arms fulcrumed on said structure, spring abutments carried by said arms, a spring exerting thrust on said abutments to engage the latter with said arms to hold said abutments in concentric relation with said sleeve structure, and a wheel housing carried by said abutments, substantially as described.

3. In a resilient hub for vehicle bearing wheels, an axle sleeve structure, supporting arms fulcrumed on said structure, abutments carried by said arms for movement lengthwise and concentrically of said structure or eccentrically thereto, a spring interposed between said abutments to hold the latter in engagement with said arms, and a wheel housing carried by said abutments and non-rotatably connected therewith, substantially as described.

4. In a resilient hub for vehicle bearing wheels, a plurality of independent supporting arms, means fulcruming said arms concentrically about an axle for free movements of said arms, spring abutments mounted on said arms, spring means forcing abutments into supported relation with said arms, and a wheel structure mounted on said abutments, substantially as described.

5. In a resilient hub for vehicle bearing wheels, an axle sleeve, supporting nuts threaded on said sleeve having a plurality of supporting arm receiving sockets opening laterally thereof, supporting arms having their ends mounted in said sockets, a retaining ring secured to each nut and threaded on said sleeve adjacent said nut to lock the latter and also hold said arms in said sockets, spring abutments movable about said sleeve and carried by said arms, spring means for holding said abutments in supported relation with said arms and permitting axial movement of said abutments toward each other and eccentric movement of said abutments with respect to said sleeve, and a wheel housing mounted on said abutments, substantially as described.

In testimony whereof I affix my signature in presence of two witnesses.

LUDVIG NELSON.

Witnesses:
J. W. SCHLOESSER,
ED HINTON.

Copies of this patent may be obtained for five cents each, by addressing the "Commissioner of Patents, Washington, D. C."